(12) United States Patent
Kang et al.

(10) Patent No.: US 7,739,999 B2
(45) Date of Patent: Jun. 22, 2010

(54) METHOD AND APPARATUS TO CONTROL COMBUSTION IN A MULTI-CYLINDER HOMOGENEOUS CHARGE COMPRESSION-IGNITION ENGINE

(75) Inventors: Jun-Mo Kang, Ann Arbor, MI (US);
Jyh-Shin Chen, Troy, MI (US);
Chen-Fang Chang, Troy, MI (US);
Tang-Wei Kuo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 291 days.

(21) Appl. No.: 11/560,498

(22) Filed: Nov. 16, 2006

(65) Prior Publication Data
US 2007/0113821 A1 May 24, 2007

Related U.S. Application Data

(60) Provisional application No. 60/739,652, filed on Nov. 23, 2005.

(51) Int. Cl.
*F02B 3/00* (2006.01)
*F02M 7/00* (2006.01)
*G06F 7/00* (2006.01)

(52) U.S. Cl. .................. 123/299; 123/435; 701/105
(58) Field of Classification Search .............. 123/299, 123/305, 295, 435, 436, 573, 304; 701/101, 701/103–105, 108
See application file for complete search history.

(56) References Cited

U.S. PATENT DOCUMENTS

| 5,642,705 | A | * | 7/1997 | Morikawa et al. | ........... 123/300 |
| 6,024,069 | A | * | 2/2000 | Yoshino | ....................... 123/295 |
| 6,058,906 | A | * | 5/2000 | Yoshino | ....................... 123/295 |
| 6,142,117 | A | * | 11/2000 | Hori et al. | .................... 123/295 |
| 6,267,095 | B1 | * | 7/2001 | Ikeda et al. | ................. 123/295 |
| 6,612,294 | B2 | * | 9/2003 | Hiraya et al. | .......... 123/568.14 |
| 6,659,068 | B2 | * | 12/2003 | Urushihara et al. | ......... 123/295 |
| 6,981,472 | B2 | | 1/2006 | Bromberg et al. | |
| 7,171,298 | B2 | * | 1/2007 | Feucht et al. | ............... 701/101 |
| 7,337,762 | B2 | * | 3/2008 | Eng et al. | .................... 123/295 |
| 2003/0140891 | A1 | | 7/2003 | Cathcart et al. | |
| 2005/0072402 | A1 | | 4/2005 | Zurloye et al. | |

OTHER PUBLICATIONS

Yamaoka, S.,HCCI Operation Control in a Multi-Cylinder Gasoline Engine, SAE Tech Paper Series, Apr. 2005, 2005-01-0120, SAE, Warrendale, PA USA.

Gnanam,G., HCCI Combustion with Internal Fuel Reforming, Varied Levels of EGR and Charge Preheat, SAE Tech Paper Series, Apr. 2005, 2005-01-0140, SAE, Warrendale, PA USA.

* cited by examiner

*Primary Examiner*—Stephen K Cronin
*Assistant Examiner*—Johnny H Hoang

(57) ABSTRACT

A method and apparatus are provided to control combustion in a multi-cylinder internal combustion engine operating in a controlled auto-ignition mode with minimum combustion phasing error using a least amount of fuel reforming. This comprises monitoring combustion in each cylinder, and determining a target combustion phasing. Fuel delivery to each cylinder is selectively controlled effective to achieve the target combustion phasing, and, effective to achieve the target combustion phasing further comprises controlling the fuel delivery effective to equilibrate combustion phasing of the cylinders.

20 Claims, 3 Drawing Sheets

METHOD AND APPARATUS TO CONTROL COMBUSTION IN A MULTI-CYLINDER HOMOGENEOUS CHARGE COMPRESSION-IGNITION ENGINE

CROSS-REFERENCE TO RELATED APPLICATIONS

This application claims the benefit of U.S. Provisional Application No. 60/739,652 filed Nov. 23, 2005, entitled METHOD AND APPARATUS TO BALANCE CYLINDER COMBUSTION USING OPTIMAL FUEL REFORMING IN A MULTI-CYLINDER HOMOGENEOUS CHARGE COMPRESSION-IGNITION ENGINE.

TECHNICAL FIELD

This invention pertains generally to internal combustion engine control systems, and more specifically to operating a homogeneous charge compression ignition engine.

BACKGROUND OF THE INVENTION

To improve thermal efficiency of gasoline internal combustion engines, dilute combustion—using either air or re-circulated exhaust gas—enhances thermal efficiency and reduces $NO_x$ emissions. However, there is a limit at which an engine can be operated with a diluted mixture because of misfire and combustion instability as a result of a slow burn in one or more cylinders. Known methods to extend the dilution limit include 1) improving ignitability of the mixture by enhancing ignition and fuel preparation, 2) increasing the flame speed by introducing charge motion and turbulence, and 3) operating the engine using a controlled auto-ignition combustion process.

The controlled auto-ignition process is also referred to as Homogeneous Charge Compression Ignition ('HCCI') process. In this process, a mixture of combusted gases, air, and fuel, referred to as a combustion charge, is created and auto-ignition is initiated simultaneously from many ignition sites within the mixture during compression, resulting in stable power output and high thermal efficiency. Since the combustion is highly diluted and uniformly distributed throughout the combustion charge, the burnt gas temperature and hence $NO_x$ emissions are substantially lower than $NO_x$ emissions of a traditional spark ignition engine, based on propagating flame front, and of a traditional diesel engine, based on an attached diffusion flame. Combustion phasing is an important aspect of the combustion process, and comprises timing of an in-cylinder combustion parameter relative to piston position and is typically measured by crankshaft rotational angle. In-cylinder combustion parameters comprise such parameters as location of peak pressure (LPP), and, an engine crank angle at which 50% of a combustion charge is burned (CA-50).

Engines operating under controlled auto-ignition combustion depend on factors including cylinder charge composition, temperature, and pressure at the intake valve closing to control combustion phasing. Hence, the control inputs to the engine, e.g., fuel injection mass and timing (relative to piston position) and intake/exhaust valve profiles, must be carefully coordinated to ensure robust auto-ignition combustion. Generally speaking, for best fuel economy, an HCCI engine operates unthrottled and with a lean air-fuel mixture.

In an HCCI engine using an exhaust recompression valve strategy, combustion charge temperatures in each cylinder are controlled by trapping hot residual gas from a previous combustion cycle during a negative valve overlap (NVO) period. The NVO period is defined as a range, characterized by engine crank-angle, during which both intake and exhaust valves for a given cylinder are closed, and occurs around TDC-intake. Recompression during an NVO period occurs by advancing closing (i.e., earlier closing) of an exhaust valve, preferably in combination with retarding opening (i.e., delayed opening) of a corresponding intake valve, preferably symmetrical about top-dead-center (TDC), during each intake phase of a combustion cycle. Both the combustion charge composition and temperature are strongly affected by the exhaust valve closing timing. In particular, more hot residual gas from a previous combustion cycle can be retained with earlier closing of the exhaust valve, which leaves less room for incoming mass of fresh air. The net results include higher temperature of the combustion charge and lower oxygen concentration of the combustion charge. The controlled use of NVO results in an ability to control the amount of hot residual gas trapped in each cylinder. During each NVO period, an amount of fuel can be injected and reformed in the combustion chamber.

In an HCCI engine with multiple cylinders, combustion phasing between individual cylinders can vary significantly due to differences in thermal boundary conditions of the individual cylinders, and differences in intake conditions, including variations in air intake, fuel injection, recirculated exhaust gases, and spark.

It is known to control combustion phasing by using extra heat released from the fuel reforming process to vary the cylinder charge temperature and the combustion phasing. However, excessive fuel reforming increases fuel consumption, and thus, it is beneficial to design a control scheme that achieves balance between cylinders with minimum combustion phasing errors using a least amount of fuel reforming.

There is a need for a system which improves performance of an HCCI engine while addressing the concerns described above.

SUMMARY OF THE INVENTION

Therefore, in accordance with an embodiment of the invention, there is provided a method and apparatus to control combustion in a multi-cylinder internal combustion engine operating in a controlled auto-ignition mode. This comprises monitoring combustion in each cylinder, and determining a target combustion phasing. Fuel delivery to each cylinder is selectively controlled effective to achieve the target combustion phasing, and, effective to achieve the target combustion phasing further comprises controlling the fuel delivery effective to equilibrate combustion phasing of the cylinders.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the drawings incorporated hereinafter, comprising.

DETAILED DESCRIPTION OF AN EMBODIMENT OF THE INVENTION

Figure 1:
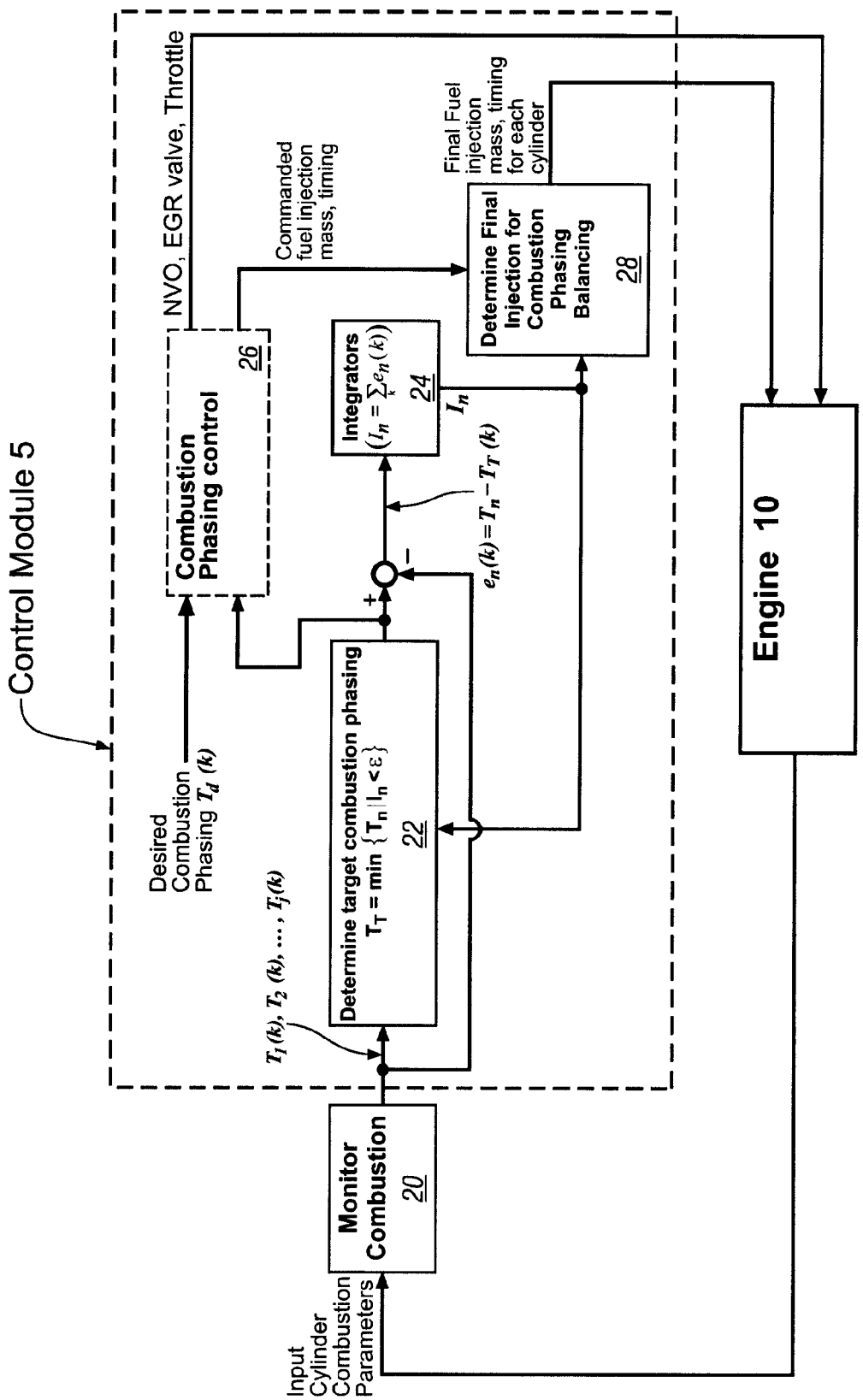
FIG. 1 is a schematic illustration of a control scheme, in accordance with the present invention; and, FIGS. 2A and 2B are data graphs, in accordance with the present invention.

Referring now to the drawings, wherein the figures are for the purpose of illustrating the invention only and not for the purpose of limiting the same, FIG. 1 depicts a schematic illustration of a control scheme for controlling an internal combustion engine 10 which has been constructed in accordance with an embodiment of the present invention. The control scheme comprises control logic, preferably executed as at least one algorithm in the control module 5, which is operative to control an aspect of overall engine operation. The electronic control module monitors and processes a plurality of inputs from the engine 10 and acts to control one or more engine actuators, all based upon the control logic.

Although not shown in detail, it is appreciated that the present invention is applicable to a multi-cylinder direct-injection, four-stroke internal combustion engine operable under a controlled auto-ignition process, i.e., the aforementioned Homogeneous Charge Compression Ignition, or HCCI. The engine configuration preferably comprises a conventional internal combustion engine having a plurality of cylinders closed on one end, with each closed-end cylinder having a moveable piston inserted therein, which defines, with the cylinder, a variable volume combustion chamber. An intake port supplies air to the combustion chamber, with flow of air into the combustion chamber controlled by one or more intake valves. Combusted (burned) gases flow from the combustion chamber via an exhaust port, with the flow of combusted gases through the exhaust port controlled by one or more exhaust valves. A system to control opening and closing of the intake and exhaust valves can include devices and control strategies that control magnitude of valve lift or valve opening, duration of valve opening, and timing of valve opening, and typically encompass intake valves and/or exhaust valves for all engine cylinders. A crankshaft is connected by a connecting rod to each piston, which reciprocates in each cylinder during ongoing engine operation. The engine is preferably equipped with an ignition system including a spark plug inserted in each combustion chamber. A crankshaft sensor monitors rotational position of the crankshaft. A fuel injector is operative to inject fuel directly into each combustion chamber and is controlled by control module 5. The fuel injector is controllable in a single injection mode or a split-injection mode. In the split-injection mode, there is a first fuel injection event, useable for fuel reforming, and a second main fuel injection event, useable for powering the engine, during each combustion cycle. In the embodiment described, each cylinder includes a cylinder pressure sensor for monitoring in-cylinder pressure during ongoing operation. Information from the cylinder pressure sensor is used in the control scheme to identify specific combustion characteristics, e.g., location of peak cylinder pressure. It is understood that alternative devices and methods that monitor and determine specific combustion parameters can be used by the control scheme within the scope of the invention. Alternative devices and methods include, e.g., spark ionization current monitoring, and crankshaft speed variation monitoring, each operative to provide parameters correlatable to combustion phasing. The engine is preferably equipped with a dual-equal variable cam phasing control device which controls openings and closings of intake and exhaust valves. The variable cam phaser is controlled by the control module 5 and operated by one of an electro-hydraulic, a hydraulic, and electric cam phaser actuator.

Combustion phasing during controlled auto-ignition engine operation can be controlled by adjusting overlap of intake and exhaust valves including negative valve overlap (NVO), and other engine operating parameters, e.g., injection mass and timing, spark timing, throttle position and EGR valve position. The NVO amount can be adjusted using many mechanisms, e.g., a fully flexible valve actuation (FFVA) system, the aforementioned dual-equal cam phasing system, and, a mechanical two-step valve system. Negative valve overlap (NVO), defined as a crank-angle period wherein both intake and exhaust valves for a given cylinder are closed, occurring during a period when a specific piston is approaches top-dead-center during an intake portion of each engine cycle (TDC-intake). NVO is used in the present invention to control the amount of hot residual gases trapped in the cylinder.

Combustion phasing of the exemplary multi-cylinder engine is affected by throttle valve position and EGR valve positions, the effects of which are global for all cylinders. Therefore throttle valve position control and EGR valve position control are not effective for controlling individual cylinder combustion phasing.

Fuel injection control is necessary to achieve auto-ignited combustion for a wide-range of engine loads. For example, at a low engine load (e.g., fueling rate<7 mg/cycle at 1000 rpm), a combustion charge may not be hot enough for stable auto-ignited combustion when a highest practical value of NVO is used, leading to a partial-burn or misfire of the combustion charge. Temperature of the combustion charge can be increased by pre-injecting a small amount of fuel near TDC-intake during recompression and NVO, resulting in fuel reforming, i.e., the fuel is transformed to a mixture of hydrogen, CO, and light HC molecules. At least part of the pre-injected fuel reforms due to the high pressure and temperature during recompression. The heat energy released from the fuel-reforming helps offset heat loss due to engine heat transfer and liquid fuel vaporization and increases the cylinder charge temperature sufficiently to auto-ignite the combustion charge created during a subsequent main fuel injection event. The amount of pre-injected fuel that reforms during recompression depends on many variables such as injected mass, injection timing and trapped exhaust gas temperature and pressure. The heat release from the fuel reforming process can be used to vary the cylinder charge temperature by controlling either the injection timing or the amount of fuel injection during the NVO period. Thus, the HCCI combustion is controlled, and is followed by a second, main fuel injection. To preserve fuel economy, it is desirable to minimize the amount of fuel used for reforming and cylinder balancing.

As previously described, the control module 5 is preferably an element of an overall control system comprising a distributed control module architecture operative to provide coordinated powertrain system control. The control module 5 synthesizes pertinent information and inputs from sensing devices, including the crank sensor, the cylinder pressure sensors, an exhaust gas sensor, and other engine sensors, and executes algorithms to control operation of various actuators, e.g., the fuel injectors and variable valve actuators, to achieve an operator torque demand, and manage engine operation to meet control targets related to factors including emissions, fuel economy, driveability, and others.

The control module 5 is preferably a general-purpose digital electronic computer generally comprising a microprocessor or central processing unit, storage mediums comprising read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. A set of control algorithms, comprising resident program instructions executable by the central processing unit, and calibrations, is stored in ROM and executed to provide the respective functions. Algorithms are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Referring again to FIG. 1, a graphical portrayal of the control scheme is depicted, comprising a method and apparatus to control combustion phasing to equilibrate combustion among the engine cylinders when the engine operates in the controlled auto-ignition mode, in accordance with the present invention.

During operation in the controlled auto-ignition mode there is a total fuel mass to be injected into each combustion chamber to meet an operator torque request and power the engine. Combustion phasing, which comprises timing of the in-cylinder combustion parameter relative to piston position, is controlled by controlling fuel reforming in each cylinder.

The control scheme operates as follows: combustion is monitored in each of the cylinders, and combustion parameters from each cylinder are monitored (Block 20) to determine a combustion phasing parameter, $T_1(k)$, $T_2(k)$, ..., $T_j(k)$, for each of the j cylinders during each engine cycle, k. In this embodiment, in-cylinder pressure as a function of crank angle is monitored for each cylinder. Combustion monitoring comprises determining a combustion operating parameter for each cylinder during each engine cycle, including e.g., an engine crank angle at which in-cylinder combustion pressure achieves a peak pressure, commonly referred to as location of peak pressure (LPP). Alternatively, combustion monitoring comprises an engine crank angle at which 50% of a combustion charge is burned (CA-50). Other combustion parameters using other monitoring schemes are applicable.

A target combustion phasing, $T_T$, is determined, preferably selected from among the combustion phasing parameters, $T_1$, $T_2$, ..., $T_j$, determined during each engine cycle (Block 22). The selected target combustion phasing, $T_T$, further comprises phasing that is achievable by each cylinder with fuel reforming. The logic used to select the target combustion phasing at engine cycle k, $T_T(k)$, is shown in Eq. 1, as follows:

$$T_T(k) = \min\{T_n(k) | I_n(k) < \epsilon\}, \quad [1]$$

wherein $T_n(k)$ is the combustion phasing of $n^{th}$ cylinder at engine cycle k, $I_n(k)$ is the integrator value of the integral controller for $n^{th}$ cylinder at engine cycle k, and $\epsilon$ is an adjustable parameter. The parameter $\epsilon$ is typically calibrated to be a sufficiently small positive number. The value $I_n(k)$ is directly related to the amount of fuel reforming requested by the controller to achieve actual combustion phasing $T_n$ which approaches $T_T$. The relationship for the integrator parameter is $I_n(k) \geq 0$ for all n and k. If the target combustion phasing, $T_T$, is achievable, each of the integrals $I_n$ converge as $T_n$ approaches $T_T$. Each engine event $T_n$ and $T_T$ are determined each engine cycle, and an error, $e_n$ is determined as a difference between the values. Each error, $e_n$ is arithmetically added to a previous value for integrator, $I_n$, to determine a new value for $I_n$ (Block 24). The target phasing, $T_T$, is output to a global combustion phasing controller preferably resident in the control module 5, to determine commanded parameters for NVO, EGR, throttle, and fuel injection mass and timing, including both the first fuel injection event and the main fuel injection event when operating in the split-injection mode (Block 26). The fuel reforming process increases cylinder temperature and, as a result, advances combustion phasing. The combustion phasing of one of the cylinders having a most advanced combustion phasing at a least amount of fuel reforming is selected as the target combustion phasing so that the other cylinders can achieve the target combustion phasing with a least amount of fuel reforming. Under an operating condition wherein the target combustion phasing is not achievable, the errors between the target combustion phasing and the other combustion phasings are preferably minimal for at least one of the cylinders, even with maximum fuel reforming with a least amount of fuel reforming.

The cylinder control scheme preferably works together with the global combustion phasing controller (Block 26) to drive the target combustion phasing, $T_T$ to the desired value for combustion phasing, $T_d$, based upon error between those two values. The commanded parameters for fuel injection mass and timing, output from the controller (Block 26) are adjusted by integrator $I_n$ to generate commands for controlling individual fuel injectors, in terms of timing of each injection event and mass of fuel injected during each injection event (Block 28).

Either the amount, or the timing, of the first fuel injection for each cylinder is controlled by an individual integral controller to minimize the difference between measured combustion phasing and the target combustion phasing. The amount of fuel delivered is typically adjusted by controlling injector pulsewidth, and the timing of injection is typically controlled based upon control of a start or an end of each injection event relative to engine crank angle and piston position. The individual integrators, $I_n$, are always larger than or equal to zero and bounded with a maximum value for all engine events. The target combustion phasing can be driven to the desired combustion phasing by adjusting other actuators, including cam phasing to adjust NVO, EGR flow, and the throttle, by action of the control module. Thus, if the target combustion phasing is achievable for all cylinders, combustion phasing from each cylinder converges to the desired combustion phasing.

Figure 2A:
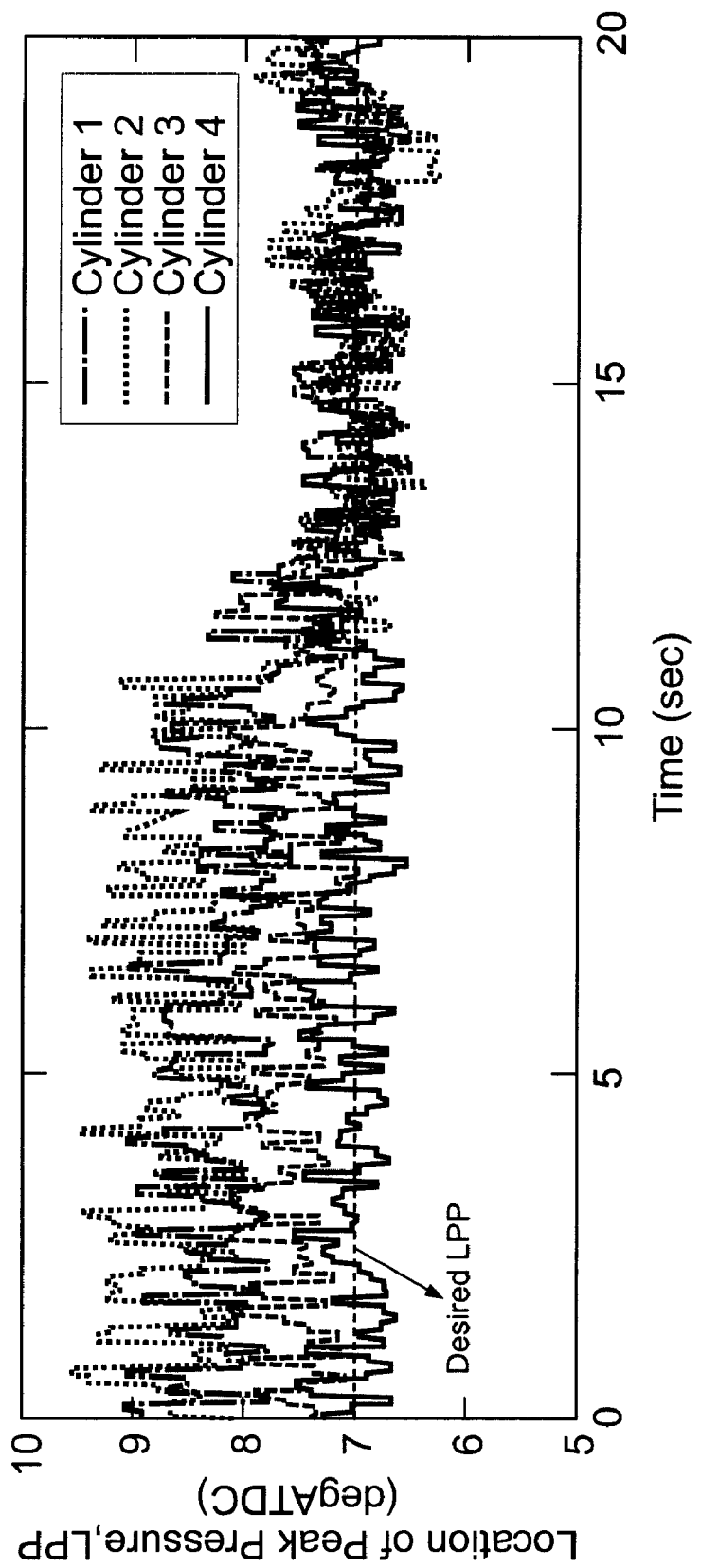
Figure 2B:
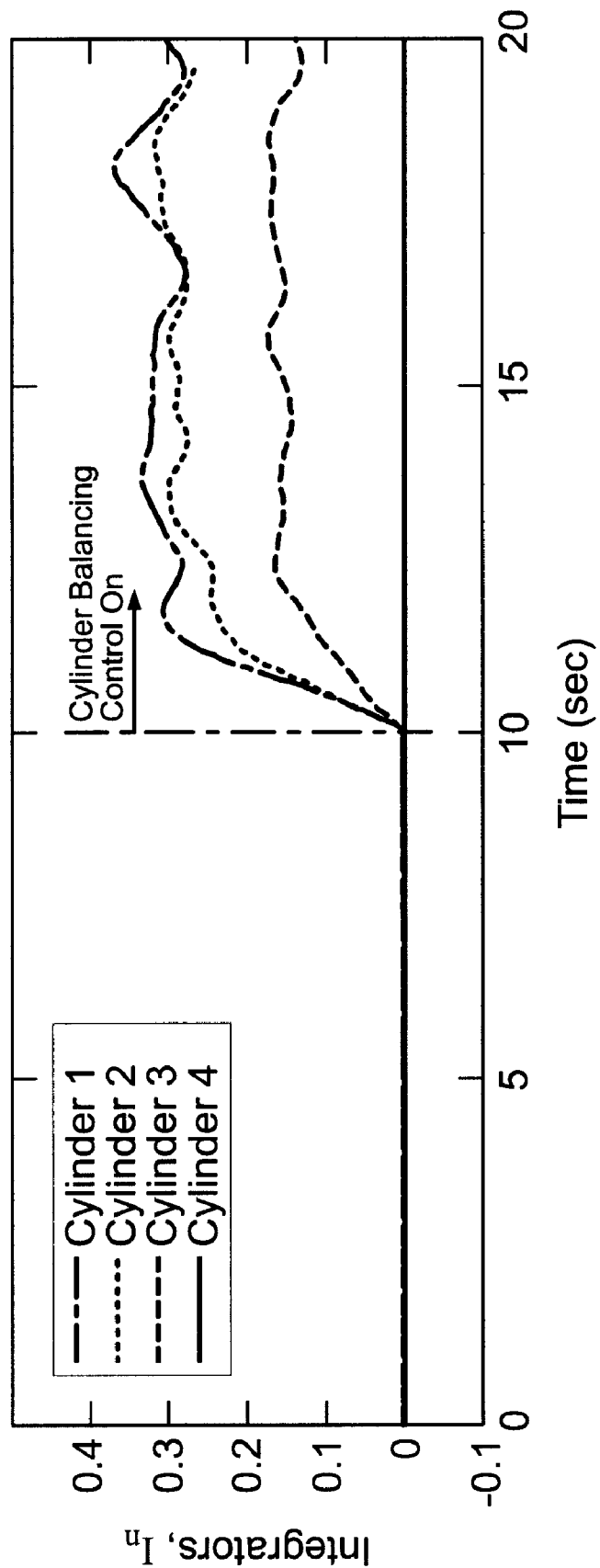

Referring now to FIGS. 2A and 2B, results from simulating operation of the exemplary HCCI engine at 1000 RPM engine speed are shown. The cylinder equilibration control scheme is actuated after about 10 seconds of operation, as shown. The results demonstrate a location of peak pressure (LPP) from each of the four cylinders which converges to a target LPP value after only a few seconds of operation, when the control scheme is operating as described hereinabove. The corresponding integrator values, $I_n$, for each of the n cylinders are shown in FIG. 2B.

The control scheme provides a method of selecting target combustion phasing and calculating an appropriate amount of fuel reforming to reduce combustion phasing difference between cylinders. In the control scheme, the individual cylinder adjustment is bounded and the combustion phasing difference among cylinders is a minimum amount with a least amount of fuel reforming. The control scheme determines and controls timing of the first injection event to adjust the level of fuel reforming in each cylinder to reduce combustion phasing difference between cylinders. Alternatively, the control scheme determines and controls mass of fuel to inject during the first injection event to adjust the level of fuel reforming in each cylinder to reduce combustion phasing difference between cylinders. Alternatively, both mass of fuel and timing of the first injection event are controlled within the control scheme to adjust the level of fuel reforming in each cylinder to reduce combustion phasing difference between cylinders. The example shown is by using first injection fuel timing only, with split-injection mode. It is understood the same algorithm can also be applied to single fuel injection event each cycle wherein timing of the injection event is controlled, and the injected fuel is sufficient to achieve some level of reformation and power the engine.

Benefits of operating an engine during HCCI mode in the manner described herein include improved engine stability, i.e., reduction in COV-IMEP. This can be used to increase operating range of the HCCI mode, resulting in improved engine efficiency and vehicle fuel economy. A further benefit comprises reducing engine-out $NO_x$ emissions, thus resulting in broader application of HCCI technology.

The present invention provides a cylinder-equilibrating fuel injection strategy which adjusts individual cylinder combustion phasing to achieve substantially equally timed combustion events in each of the cylinders during operation in controlled auto-ignition mode. By controlling one of injection timing or amount of fuel injection during the first, reforming, fuel injection event occurring in the NVO period, the heat release from the fuel reforming process can be used to vary the cylinder charge temperature. This is preferably followed by the second, main fuel injection event. The method can also be applied to a single fuel injection by adjusting the injection timing to control the fuel reforming process and the combustion phasing.

Combustion phasing for each cylinder of the multi-cylinder HCCI engine is individually controlled with fuel reforming in the present invention. This reduces the difference in combustion phasing among cylinders and improves the combustion stability during HCCI operation. The algorithm achieves cylinder balancing with a minimum amount of fuel reforming, therefore maintaining fuel economy performance characteristic of HCCI engines.

The invention has been described with specific reference to the embodiments and modifications thereto. The specific details of the control scheme and associated results described herein are illustrative of the invention as described in the claims. Further modifications and alterations may occur to others upon reading and understanding the specification. It is intended to include all such modifications and alterations insofar as they come within the scope of the invention.

Having thus described the invention, it is claimed:

1. A method to control combustion in a multi-cylinder internal combustion engine, comprising:
   monitoring combustion in each of the cylinders during operation in a controlled auto-ignition mode;
   determining a target combustion phasing comprising selecting one of the cylinders having a most advanced combustion phasing at a least amount of fuel reforming; and,
   selectively controlling fuel delivery to each of the cylinders effective to achieve the target combustion phasing.

2. The method of claim 1, wherein monitoring combustion in each cylinder comprises determining phasing of a combustion event in each cylinder.

3. The method of claim 1, wherein selectively controlling fuel delivery to each cylinder effective to achieve the target combustion phasing further comprises controlling the fuel delivery effective to equilibrate combustion phasing of the cylinders.

4. A method to control combustion in a multi-cylinder internal combustion engine, comprising:
   monitoring combustion in each of the cylinders during operation in a controlled auto-ignition mode, wherein monitoring combustion in each cylinder comprises determining phasing of a combustion event in each cylinder, and wherein determining phasing of a combustion event in each cylinder further comprises determining a location of peak cylinder pressure in each cylinder during the combustion event;
   determining a target combustion phasing; and
   selectively controlling fuel delivery to each cylinder effective to achieve the target combustion phasing.

5. The method of claim 4, wherein determining phasing of a combustion event in each cylinder further comprises determining a crank angle location at which fifty percent of a combustion charge is burned in each cylinder during the combustion event.

6. A method to control combustion in a multi-cylinder internal combustion engine, comprising:
   monitoring combustion in each of the cylinders during operation in a controlled auto-ignition mode;
   determining a target combustion phasing; and
   selectively controlling fuel delivery to each cylinder effective to achieve the target combustion phasing, wherein selectively controlling fuel delivery to each cylinder comprises
      controlling the fuel delivery effective to equilibrate combustion phasing of the cylinders, and
      executing a split fuel injection mode and controlling a first fuel injection effective to substantially reform the injected fuel.

7. The method of claim 6, further comprising controlling the first fuel injection to occur substantially during a negative valve overlap period.

8. The method of claim 6, wherein controlling the first fuel injection event effective to substantially reform the injected fuel comprises controlling fuel mass injected during the first fuel injection.

9. The method of claim 6, wherein controlling the first fuel injection event effective to substantially reform the injected fuel comprises controlling fuel mass and timing of the first fuel injection.

10. The method of claim 6, wherein controlling the fuel delivery further comprises: executing a single fuel injection effective to reform a portion of the injected fuel and effective to power the engine.

11. Article of manufacture, comprising a computer-readable storage medium having a machine-executable code encoded therein effective to control combustion in a multi-cylinder internal combustion engine, the code comprising:
   code to monitor combustion in each cylinder during operation in a controlled auto-ignition mode;
   code to determine a target combustion phasing comprising selecting one of the cylinders having a most advanced combustion phasing at a least amount of fuel reforming; and,
   code to selectively control fuel delivery to each of the cylinders effective to achieve the target combustion phasing and effective to equilibrate combustion phasing of the cylinders.

12. Article of manufacture, comprising a computer-readable storage medium having a machine-executable code encoded therein effective to control combustion in a multi-cylinder internal combustion engine, the code comprising:

code to monitor combustion in each cylinder during operation in a controlled auto-ignition mode, wherein the code to monitor combustion comprises code to monitor engine combustion pressure to determine combustion phasing for each combustion chamber during operation in the controlled auto-ignition mode;

code to determine a target combustion phasing; and code to selectively control fuel delivery to each cylinder effective to achieve the target combustion phasing and effective to equilibrate combustion phasing of the cylinders.

13. The article of manufacture of claim 12, wherein the code to monitor combustion comprises: code to monitor crankshaft speed variation to determine combustion phasing for each combustion chamber during operation in the controlled auto-ignition mode.

14. The article of manufacture of claim 12, wherein the code to monitor combustion comprises: code to monitor spark ionization current to determine combustion phasing for each combustion chamber during operation in the controlled auto-ignition mode.

15. A method to control combustion in a multi-cylinder internal combustion engine, comprising:

determining a set of combustion phasing parameters by monitoring a crank angle location of a combustion event in each cylinder during operation in a controlled auto-ignition mode, wherein determining a set of combustion phasing parameters comprises determining a crank angle at which half of a combustion charge is burned in each cylinder during a combustion event;

determining a target combustion phasing based upon the set of determined combustion phasing parameters; and, selectively controlling fuel delivery to each cylinder effective to achieve the target combustion phasing.

16. A method to control combustion in a multi-cylinder internal combustion engine operating in a controlled auto-ignition mode, comprising:

determining a set of combustion phasing parameters by monitoring a crank angle location of a combustion event in each cylinder, wherein determining a set of combustion phasing parameters further comprises determining a crank angle location of peak cylinder pressure in each cylinder during the combustion event;

determining a target combustion phasing based upon the set of determined combustion phasing parameters; and selectively controlling fuel delivery to each cylinder effective to achieve the target combustion phasing.

17. The method of claim 16, wherein determining a set of combustion phasing parameters further comprises determining a crank angle location at which fifty percent of a combustion charge is burned in each cylinder during the combustion event.

18. The method of claim 16, wherein determining the target combustion phasing further comprises selecting a most advanced combustion phasing parameter from the set of combustion phasing parameters that is achievable in each cylinder with fuel reforming.

19. The method of claim 16, wherein selectively controlling fuel delivery to each cylinder effective to achieve the target combustion phasing further comprises controlling the fuel delivery effective to equilibrate combustion phasing of the cylinders.

20. The method of claim 19, wherein controlling the fuel delivery further comprises: executing a split fuel injection mode and controlling a first fuel injection effective to substantially reform the injected fuel.

* * * * *